US010433084B2

(12) United States Patent
Anderson

(10) Patent No.: US 10,433,084 B2
(45) Date of Patent: Oct. 1, 2019

(54) NETWORK SYSTEM FOR RELIABLE RECEPTION OF WIRELESS AUDIO

(71) Applicant: Sound Devices LLC, Reedsburg, WI (US)

(72) Inventor: Matt Anderson, Madison, WI (US)

(73) Assignee: Sound Devices LLC, Reedsburg, WI (US)

( * ) Notice: Subject to any disclaimer, the term of this patent is extended or adjusted under 35 U.S.C. 154(b) by 0 days.

(21) Appl. No.: 15/623,522

(22) Filed: Jun. 15, 2017

(65) Prior Publication Data
US 2018/0035222 A1   Feb. 1, 2018

Related U.S. Application Data

(60) Provisional application No. 62/367,367, filed on Jul. 27, 2016.

(51) Int. Cl.
| | |
|---|---|
| H04B 3/00 | (2006.01) |
| H04R 27/00 | (2006.01) |
| G10L 19/005 | (2013.01) |
| G10L 19/008 | (2013.01) |
| H04W 4/06 | (2009.01) |
| H04R 3/00 | (2006.01) |
| H04B 5/06 | (2006.01) |
| H04R 1/08 | (2006.01) |

(52) U.S. Cl.
CPC ............ *H04R 27/00* (2013.01); *G10L 19/005* (2013.01); *G10L 19/008* (2013.01); *H04W 4/06* (2013.01); *H04B 5/06* (2013.01); *H04R 1/08* (2013.01); *H04R 2227/003* (2013.01); *H04R 2420/07* (2013.01)

(58) Field of Classification Search
CPC . H04R 27/00; H04R 2227/003; G10L 19/005; G10L 19/008
USPC .................................................. 381/80, 122
See application file for complete search history.

(56) References Cited

U.S. PATENT DOCUMENTS

| | | | |
|---|---|---|---|
| 9,071,913 B2 | 6/2015 | Koch et al. | |
| 2006/0193466 A1* | 8/2006 | Rodman | H04M 9/082 379/406.06 |

(Continued)

OTHER PUBLICATIONS

International Search Report and Written Opinion in co-pending PCT Application PCT/US17/37599 dated Sep. 11, 2017.

*Primary Examiner* — Xu Mei
*Assistant Examiner* — Ammar T Hamid
(74) *Attorney, Agent, or Firm* — Andrus Intellectual Property Law

(57) ABSTRACT

Methods and devices are provided for a wireless microphone network whereby robustness for reception of audio information transmitted by one or more wireless microphones is enhanced. The system incorporates a dual stage network approach for collecting, transmitting and receiving audio information. In the first stage, audio information collected by one or more microphone modules is transmitted to a series of receiver base stations. In the second stage, information received at each base station is subsequently transmitted to a receiver hub that selects or augments the information to produce a high quality representation of audio information, which provides improved robustness and reliability with respect to the movement or physical placement of each microphone module.

16 Claims, 5 Drawing Sheets

(56) References Cited

U.S. PATENT DOCUMENTS

| | | | |
|---|---|---|---|
| 2011/0039554 A1* | 2/2011 | Bims | H04L 1/0033 |
| | | | 455/434 |
| 2011/0211524 A1 | 9/2011 | Holmes et al. | |
| 2013/0311001 A1 | 12/2011 | Lindenbauer et al. | |
| 2012/0114025 A1* | 5/2012 | Gauthier | H04B 7/0811 |
| | | | 375/219 |
| 2014/0154968 A1* | 6/2014 | Root | H04H 20/61 |
| | | | 455/3.05 |
| 2014/0269951 A1 | 9/2014 | Babarskas et al. | |
| 2014/0334635 A1* | 11/2014 | Larsson | H04R 1/08 |
| | | | 381/77 |
| 2017/0171361 A1* | 6/2017 | Green | H04L 65/601 |

* cited by examiner

NETWORK SYSTEM FOR RELIABLE RECEPTION OF WIRELESS AUDIO

BACKGROUND

Wireless microphones are commonly used in numerous recording, playback or broadcast environments, including concerts, live stage recording, theatre, education, conferences, television or radio. The microphone modules themselves are often configured as either handheld or as a smaller lavalier microphone unit that is connected with a transmitter pack. Audio information collected by a wireless microphone module is transmitted to be received by an array of receiver base stations. The transmitter unit in the microphone module should be as lightweight as possible, while providing a sufficiently long lifetime of operation without the need for battery recharging or replacement while at the same time, providing as wide of a range as possible for the allowable physical location of the module. The strength of signal received by a base station is dependent on both the strength (power level) of the transmitted signal and location of the microphone module relative to a base station. Accordingly, it is desirable to create a wireless microphone system with an improved range of reception for a given transmission power level.

SUMMARY

The disclosed invention provides a means to extend the allowable physical range for the operation of a wireless microphone. This can be accomplished while maintaining limits on the power levels used for data transmission between a microphone module and two or more receiving base stations.

A microphone module may be worn or carried by a user or mounted in close proximity to a desired sound source such as a performer, talker, musical instrument or other acoustic source. In the case of a wireless microphone module, audio information may be wirelessly communicated to another location for storage (recording), playback or broadcast. The efficacy of such a system depends on reliable wireless transmission of audio data. Tradeoffs in designing a wireless microphone module include the size and weight of the battery, the transmitter output power level, useful battery life and bandwidth (or transmission data capacity) in order to maintain reliability of transmission over a sufficient range for the physical placement or movement of the microphone module. Extending the allowable range of microphone modules for a fixed or lower transmitter power level provides an opportunity for using a smaller or lighter weight battery, reduced power consumption and/or using a lower power transmitter design and may even aid in helping make devices compliant with FCC or other government regulations.

According to the invention, each microphone module transmits collected audio information wirelessly through a first stage of the network to be received by two or more base stations at different physical locations. Depending on their locations, each of them will present a distinct level of electromagnetic coupling and noise level or interference with respect to the current location for each transmitting microphone module. Therefore, at any given time, the available received signal strength (or signal to noise ratio) for each module will vary from one base station to another. Accordingly, depending on physical placement, one or more base stations will have an advantage in receiving transmitted audio data over the others.

Within the context of the invention, two or more base stations remain operative in attempting to receive wireless information from a given microphone module at the same time. These base stations then each relay the audio information or data they collect, sending it over a secondary stage of the network to a receiver hub. The secondary stage of the network is preferably based on either wired or wireless Ethernet connections established between each base station and the receiver hub. In the preferred embodiment, data packets are encoded based on the "Digital Audio through Ethernet" (DANTE) protocol (Layer 3 packets) or other network compatible format before transmitting (or broadcasting) them to the receiver hub. Other protocols using the Ethernet wiring and signaling components that do not rely on the Ethernet frame structure (Layer 1 protocols) that may also facilitate communication for the second stage of the network include: AES50, SuperMAC, HyperMAC, A-Net, AudioRail, RockNet or Hydra2. Furthermore, other protocols relying on standard Ethernet packets (Layer 2) may include: AES51, AVB, Ethersound, REAC, SoundGrid, or dSnake. Finally, other audio over Ethernet protocols based on network layer packets (Layer 3) may include: UDP data packets, AES67, AVB, NetJack, RAVENNA, Livewire, Q-Lan or WheatNet-IP. Any of these can suffice for communication in the second stage of the communications network provided each base-station is equipped for the encoding and transmission (or broadcast) of data and the receiver hub is equipped for the decoding and reception of incoming audio data. The receiver hub collects and analyzes information received from each base station to construct the best possible representation of information (audio waveform) originally detected and sent by the microphone module. The resultant audio information or constructed waveform is supplied to one or more endpoints.

In some embodiments, operations performed by the receiver hub may include dynamically selecting audio data sent by the base station that has the lowest error rate in its decoded audio signal. In other embodiments, it may select decoded information received by the base station reporting the highest signal strength from the microphone module. In yet other embodiments, the decoded information from multiple base stations may be blended together with decoded information from multiple base stations to produce a decoded signal that is a higher quality than what would otherwise be possible from audio data received from a single base station. Based on this, the receiver hub reconstructs and outputs a waveform or data representing of the original audio waveform.

This resultant output from the receiver hub may then be recorded, broadcast, mixed with other audio sources and/or played back to listeners via headphone or loudspeaker arrangement. In some embodiments, the microphone modules themselves will encode audio waveform data for reduced bandwidth requirements. In these cases, the step of decoding the data for the actual audio waveform (audio PCM data) may be performed at either each base station, the receiver hub or at a later time if this data is to be recorded.

DETAILED DESCRIPTION

Figure 1:
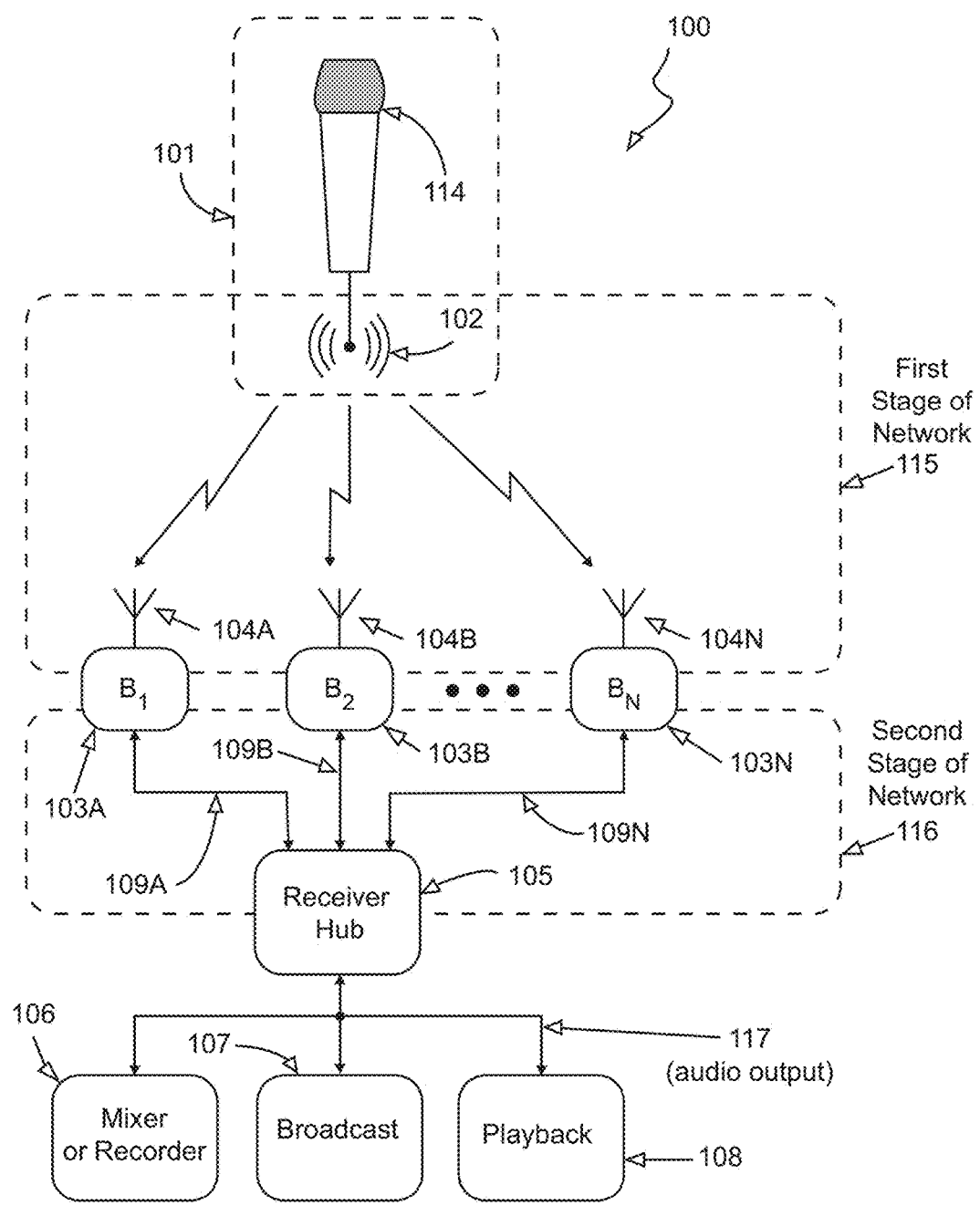
FIG. 1 is a simplified diagram of a wireless microphone system with a two-stage network configured in accordance with a first exemplary embodiment of the present invention, where the second stage is based on a star topology.

FIG. 1 shows a wireless microphone system 100 constructed in accordance with an exemplary embodiment of the invention. In this disclosure, the term "audio waveform" refers to physical acoustic sound or vibration present at a given location that is desired to be captured via a wireless microphone. As shown in FIG. 1, a microphone module 101 includes at least one microphone element 114 for sensing an audio waveform and a microphone transmitter 102 that contains suitable electronics and an antenna such that it is capable of wirelessly transmitting information or data from the microphone module 101. Normally, the transmitted information would allow for characterization of or describing the audio waveform over time.

For example, with a digital wireless microphone, the microphone module 101 may convert the audio waveform to an electrical waveform and digitize it using an analog to digital converter (ADC) at a given sample rate to create digital audio data. In some embodiments, data compression may be used for reducing the data rate required for transmission of the audio data.

In the case of a an analog wireless microphone, the microphone module 101 may amplify and condition the audio waveform into an electrical analog signal that will also be referred as audio data in this disclosure.

Resultant audio data can be used as a basis for frequency modulating a carrier provided to the microphone transmitter 102. The modulation used for transmitting wireless audio data from the microphone module 101 may rely on FM, PSK, BPSK, QPSK, OFDM, etc. and/or spread-spectrum techniques. Other elements not shown that may be part of the design for the microphone module 101 include a housing for structural support, various circuits, power supplies, batteries, adapters, clips, amplifiers, companders, limiters, signal conditioners or filters, analog to digital converters, communications circuits, modulators, antennas, FPGAs, microprocessors, digital signal processors and/or software for configuration, control and operation of the microphone module 101 that will be apparent to one skilled in the art.

A series of base stations (103A, 103B . . . 103N) placed in the general vicinity of the microphone module 101 attempts to receive wireless audio data being transmitted by the microphone module 101. Each base station includes or is coupled with a base station receiver. Specifically, a first base-station 103A is coupled with a first base station receiver 104A, a second base station 103B is coupled with a second base station receiver 104B through an $N^{th}$ base-station 103N that is coupled with an $N^{th}$ base station receiver 104N. Each base-station receiver, 104A, 104B through 104N, includes an antenna and may be placed in the vicinity of the microphone transmitter 102 (or location where it is expected to be near at some point in time depending on the anticipated movement or location of the microphone module 101). Each base-station receiver, 104A, 104B through 104N, attempts to wirelessly detect the RF signal modulated by audio data, demodulate it and retrieve the original audio data or waveform that was transmitted from the microphone module 101 by its microphone transmitter 102. Each base station will also include the required internal electronics and/or software as needed to further process the received audio data or waveform and transmit it from an attached communications link, 109A, 109B through 109N, as later described in this disclosure. In some embodiments, a base station receiver may be integrated into the same unit as its corresponding base-station. In other embodiments, a base station may be packaged separately from (although still connected to) its base-station receiver. Similarly, a microphone module 101 may be integrated with its transmitter 102 in the same package, or they may be packaged separately, (although still connected). While a total of N base stations are indicated by the diagram, in some embodiments, only two base stations (N=2) or three (N=3) may be required. In general, the invention may be flexible in how many base stations are used. In the art, wireless microphone systems that utilize multiple receiving base stations are often referred to as "diversity wireless receivers" or are referred to as having "diversity reception".

In FIG. 1, an electromagnetic pathway is drawn between each base station receiver, 104A, 104B through 104N, and the microphone transmitter 102. However, the ability for each base station to receive audio data from the microphone module 101 will in general depend on the position of the microphone transmitter 102 relative to the placement of each base station receiver 104A, 104B through 104N. For example, if the microphone transmitter 102 is placed closer to the first base station 104A receiver and further from second base station 104B receiver, the first base station receiver 104A may have an advantage in receiving a higher signal-to-noise ratio (SNR) at its antenna than for the second base station receiver 104B. Accordingly, in the case of a digital wireless transmission of audio data from the microphone transmitter 102, the first base station 103A may be able to accept a higher rate of data transmission and/or achieve a lower error rate in receiving audio data from the microphone module 101 than for the second base station 103B. In the case of an analog wireless transmission of audio data from the microphone transmitter 102, the first base station 103A may be able to provide a higher SNR for the received audio data than for the second base station 103B.

In contrast, if at a later time, the microphone transmitter 102 is moved to a position closer to the second base station receiver 104B than for the first base station receiver 104A, the second base station receiver 104B may have an advantage in receiving a higher signal-to-noise ratio (SNR) at its antenna than for the first base station receiver 104A. Accordingly, in the case of a digital wireless transmission of audio data from the microphone transmitter 102, the second base station 103B may be able to accept a higher rate of data transmission and/or achieve a lower error rate in receiving audio data from the microphone module 101 than for the first base station 103A. In the case of an analog wireless transmission of audio data from the microphone transmitter 102, the second base station 103B may be able to provide a higher SNR for received audio data (waveform) than for the first base station 103A.

In general, the SNR with respect to data transmitted by the microphone transmitter 102 will vary from one base station receiver to another. While the SNR will depend on the distance between each base station receiver and the microphone transmitter 102, it may also depend on electromagnetic interference caused by other objects or obstructions, the position, spectral content and strength of other electromagnetic noise/interference sources, and line of sight between the base-station receiver in question and the microphone transmitter 102. In some embodiments, the base stations and their receivers themselves may not be identical. In these cases, the received SNR or transmission error rate may also depend on differences between the antenna and/or amplifiers or other electronics used within each base-station and its receiver.

In some embodiments, the location of the microphone module 101 (and often, the microphone transmitter 102 integrated with or connected to it) may be fixed. For example, it may be mounted on a microphone stand in front of a performer. In other embodiments, the microphone transmitter 102 may be moving. For example, it may be carried by a performer in a live theatre setting. In general, knowing which base-station receiver, 104A, 104B through 104N will provide the highest SNR or most reliable data communication link to the microphone transmitter 102 is very difficult to determine. This depends on a myriad of factors going beyond the simple location of either the microphone transmitter 102 or any of the base-station receivers, 104A, 104B through 104N. Furthermore, in many settings, the index (for example, indexing the first base-station 104A as "A", the second base-station 104B as "B" and so on to index the $N^{th}$ base-station 104N as "N") for the base station receiver provided the best reception may rapidly change over time. For example, performers, theatre/stage equipment/props, microphone modules (and their transmitters) and interference sources may move about and in some cases, even the location of the base stations and their receivers may change.

Additionally, the occurrence of errors in the reception of transmitted audio data are statistical in nature with the exact timing and number of errors for digital transmission of audio data or details of noise induced for transmission of analog audio data impossible to predict with respect to each base-station. For example, even if the microphone transmitter 102 is much closer to the first base station receiver 104A and provides it with a higher SNR than for the second base station receiver 104B, there still may be instances or periods of time when digital transmission errors occur for reception of data at the first-base station 103A, while data is properly received by the second base-station 103B. As another example, if an interference source is placed much closer to the first base station receiver 104A than for the second base station receiver 104B, the SNR for reception at the first base station receiver 104A may be worse than for the second base station receiver 104B, even if the second base station receiver is farther from the microphone transmitter 102 and presents a lower overall wireless signal level.

Previous approaches that assign one base-station receiver or another to receive wireless audio data from the microphone transmitter 102 suffer from the fact that when errors or noise occur for the selected base-station, there may be others that could have otherwise more accurately received the audio data. In the case of digital wireless transmission, this would imply a lower error rate or error free transmission and in the case of analog wireless transmission, providing it with a lower noise level.

The invention overcomes the important problem of knowing which base-station is best suited for receiving audio data by having multiple (or in the preferred embodiment, all) base stations continuously receiving data from the microphone transmitter 102 and continuously forwarding this data to a receiver hub 105, which retains access to all available information over time. Furthermore, in some embodiments, the base stations may incorporate a receive signal strength indicator (RSSI) providing a measure of the power present in their received radio signals and also transmit up to date information regarding received signal levels to the receiver hub 105 over time.

As shown in FIG. 1, the first base station 103A is provided with a secondary communications link 109A to a receiver hub 105. Similarly, the second base-station 103B is provided with a secondary communications link 109B to a receiver hub 105. This continues for each additional base-station until the $N^{th}$ base-station 103N, being provided with a secondary communications link to the receiver hub 105. The receiver hub 105 may contain a predetermined number of physical connections where the software/hardware present in the receive hub 105 will recognized the connection or absence of a base station connected to each corresponding port.

As indicated in FIG. 1, the combination of the microphone transmitter 102, and the collection of each path electromagnetically coupling it to each base-station and each base-station receiver can be considered as comprising the first stage 115 of a communications network. This is indicated by a dashed box is 115 surrounding these elements in FIG. 1.

In contrast, the combination of each communications link, 109A, 109B through 109N and receiver hub 105 can be considered as comprising a second stage 116 of a communication network. This is again indicated by a dashed box 116 surrounding these elements in FIG. 1.

Base stations 103A, 103B through 103N can be considered as bridging the two stages 115, 116 of the communications network, as they receive wireless audio data from their respective base-station receivers 104A, 104B through 104N and re-transmit or broadcast this information over the communications links, 109A, 109B through 109N. The communications links 109A, 109B through 109N may be either wired or wireless and in the preferred embodiment, based on an Ethernet connection. In these cases, base stations 103A, 103B through 103N preferably further processes and reformat audio data received by their respective base-station receivers 104A, 104B through 104N into a series of internet protocol (IP) packets (or layer 3 IP packets), where the data format is based on the "Digital Audio Network Through Ethernet" or DANTE protocol.

Upon receiving the audio data re-transmitted from each base-station through the second stage 116 of the network, the receiver hub 105 may construct an audio output or data stream 117 representing the original audio data (or as close an approximation as possible) sent by the microphone module 101. It may perform this by augmenting data segments selected from any base-station and in dependence on the ability of each base station to receive audio data (or a waveform) as a function of time.

In some embodiments where data is digitally transmitted between a microphone module 101 and each base-station 103A, 103B through 103N, the microphone module 101 may digitize the audio waveform received from the microphone element 114 and subsequently encode the data for a reduced data rate. It may furthermore encode the data utilizing an error correcting code. In some embodiments, encryption may be additionally applied. For these embodiments, the receiver hub 105 may construct an error free audio output or data stream 117 by decoding (and when required, decrypting) the received data and augmenting data segments where error correction is possible. Otherwise, in cases where no segments exist that are either error-free or would allow for complete error correction, the receiver hub 105 may select segments for audio output or data stream 117 construction that have the lowest error rate. In cases where error correction is not used but the data transmission format allows for error detection, the receiver hub 105 may construct the audio output or data stream 117 by augmenting data segments selected to have the lowest number of detected errors. The length of segments may range from a few micro-seconds to many seconds.

In some embodiments, analog data transmission occurs between the microphone module 101 and each base-station 103A, 103B through 103N. For example, the transmitter 102 of the microphone module 101 may transmit an audio signal based on an analog wideband FM signal occupying a transmission bandwidth of approximately 200 kHz over the first stage 115 of the network. In these cases, each base station 103A, 103B through 103N may digitize, encode and forward the received signals with any noise artifacts over the second stage of the network 116 to the receiver hub 105. The receiver hub 105 may then reconstruct a reduced noise or noise-free audio output or data stream 117 based on the combination of received (or streamed) segments of audio data (or waveform) extracted from the data packets. For example, it may simply select the signal corresponding to the base-station reporting the highest signal level. In some embodiments, it may blend the audio data on a basis of the signal strength reported from each base-station. For example, if two base stations are both receiving an analog signal based on a signal strength that is similar between them, the receiver hub 105 may construct an output based on an average between the two received audio signals. In some embodiments, the output may be formed based on a weighted sum of the audio waveform received or reconstructed from each base station where the weighting is dependent on the signal levels detected at each base station. Finally, embodiments are envisioned where if several base stations 103A, 103B through 103N detect a good signal level, the output may be formed on a basis of outlier rejection. For example, if at a point in time, the waveforms from two of the base stations are reported as 0.5 and 0.52, while a third base station reports an audio waveform having a value of 1.5, this value would be rejected as being an outlier and the constructed output may be selected as the average of the remaining two values as being 0.51. In some embodiments, when several base stations are reporting receiving audio data, a median filter may at times, be advantageous. For example, applying this to the data from the previous example would yield an output value of 0.52. The method uses for constructing the output signal may also change or vary as a function of time in dependence on how many base stations are reporting successful receipt of audio data, the signal strengths and/or the statistical nature of errors and/or noise.

The audio output data stream 117 from the receiver hub 105 may consist of either an analog audio output, digital audio PCM, compressed digital audio or other data stream representing the audio waveform or providing a means to reconstruct it. It is provided as an input to one or more end-points. Examples of end-points shown in the system 100 of FIG. 1 include a mixer/recorder 106, a broadcast network 107 or a playback device 108. Other types of end-points can include virtually any device or system that could benefit from access to the audio output or data stream 117 and are envisioned within the scope of this disclosure.

Figure 2:
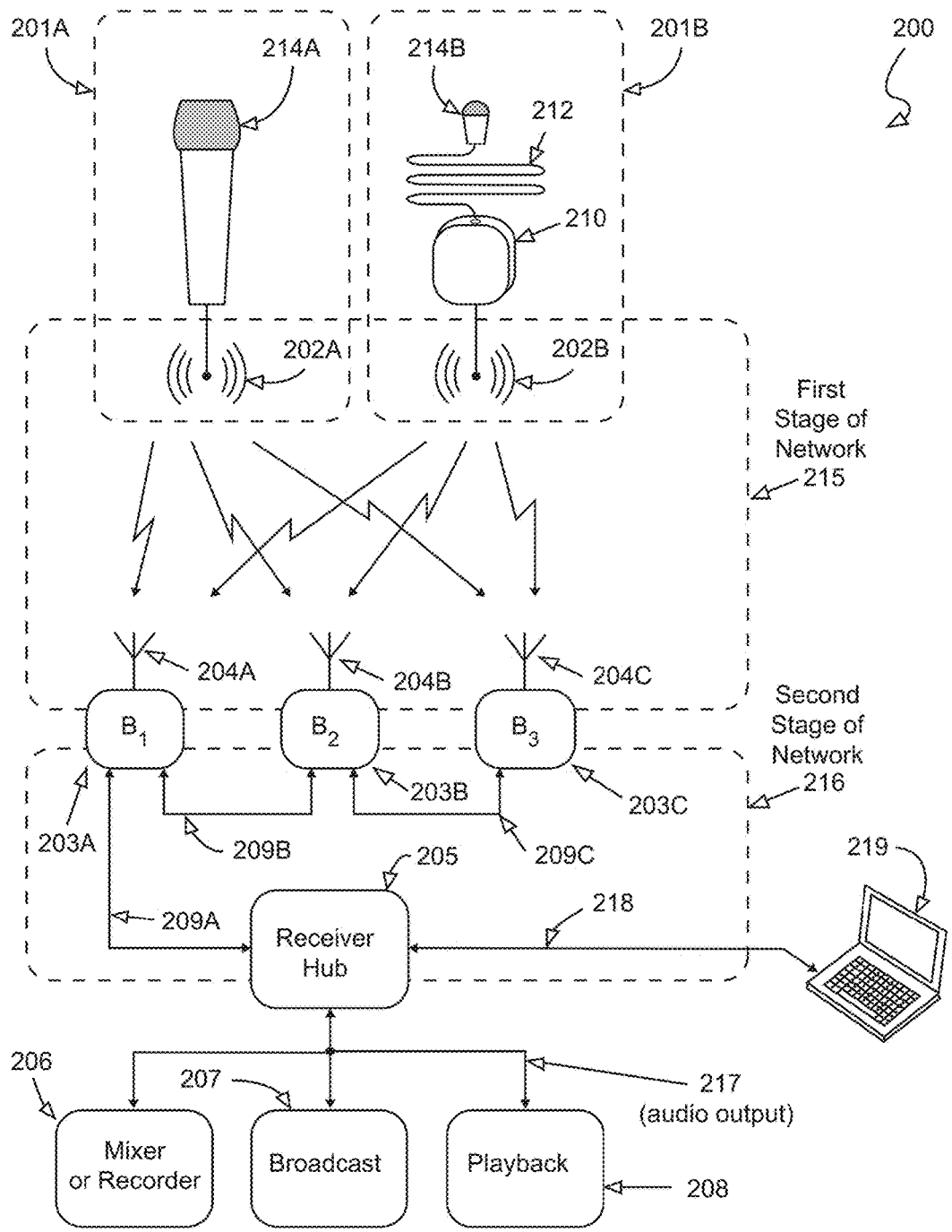
FIG. 2 is an example embodiment of the invention including two microphone modules where the second stage of the network is based on a linear or ring (also often referred to as a "daisy chain") topology.

FIG. 2 shows a system 200 constructed in accordance with another exemplary embodiment of the invention. In contrast to the system 100 of FIG. 1, the system of FIG. 2 illustrates the use of multiple microphone modules 201A and 201B connected to respective transmitters 202A and 202B for wirelessly communicating audio data to three wireless receivers 204A, 204B and 204C paired with base stations 203A, 203B and 203C respectively. In a similar manner to the system 100 in FIG. 1, the transmitters 202A and 202B, their electromagnetic coupling to receivers 204A, 204B and 204C and the receivers themselves may be construed as comprising the first stage 215 of a network.

In the second stage 216 of the network, each of the three base stations 203A, 203B and 203C may be serially linked (or "daisy chained") for communication with the receiver hub 205. In this topology, the third base station 203C is linked by communication link 209C to the second base station 203B, that is linked by communications link 209B to the first base station 203A, that is linked by communications link 209A to the receiver hub 205. With this topology, each base station 203A, 203B, 203C in addition to receiving wireless audio data and forwarding (or broadcasting) this data downstream to the next base station or receiver hub 205 must also forward audio data received by it from the upstream base station toward the downstream receiver hub 205.

In other embodiments, either two of more than three base stations may be serially connected from the receiver hub. In some embodiments, more than one daisy chain of serially connected base stations may emanate from the receiver hub 205. Alternative embodiments envisioned in the scope of this disclosure include those where the network topology for the second stage 216 of the network may include any combination of communications links such that each base station 203A, 203B, 203C has a pathway present whereby audio data received by it may be broadcasted such that it is forwarded along some path to the receiver hub 205. The receiver hub 205 and its internal software/hardware may be configured to automatically detect the connection for each base station 203A, 203B, 203C, including the addition or deletion of base stations, e.g. being added or removed from the end of the daisy chain. Furthermore, software/hardware present in each base station 203A, 203B, 203C may be configured to automatically detect the addition or removal of a base station upstream from it and adjust the forwarding of data to the downstream base station or receiver hub 205 accordingly. Again, the the receiver hub 205 is Ethernet, while the preferred data format for broadcast is DANTE. With this design, an arbitrary number of base stations may be connected along each daisy chain emanating from the receiver hub 205.

Like in the system 100 of FIG. 1, each base station receives audio from microphone module 201A via its microphone transmitter 202A. However, each base station may also receive audio data from a second microphone module 201B via its microphone transmitter 202B. In other embodiments, more than two microphone modules may wirelessly transmit audio data to be received by the base station.

In cases where multiple microphone modules 201A, 201B are wirelessly transmitting audio data to the base stations 203A, 203B, 203C, each microphone module will need to be configured to transmit on its respective channel and each base station receive will need to be configured to receive wireless audio data on the corresponding channels. Furthermore, each microphone module 201A, 201B need not be identical for the application of this invention. As can be seen from FIG. 2, one microphone module 201A is depicted as an integrated unit 214A, while the other microphone module is depicted as being a lavalier type element 214B with a connection 212 to a body pack transmitter 210 integrated with its microphone transmitter 202B. In some embodiments, base stations may even be configured to receive multiple wireless transmission formats from different types of microphone modules, including mixing analog and digital microphone modules.

Since the base stations 203A, 203B and 203C are receiving multiple channels of wireless audio data, each channel of data is processed in the receiving base station separately with respect to its channel. Similar to the single microphone module system 100, base stations 203A, 203B, 203C in the multiple microphone module system 200 may each reformat the received data. In many cases, a DANTE compatible protocol may be preferable, although other IP or Ethernet protocols that support audio may also be used. Each base station 203A, 203B, 203C broadcasts the resultant data through the second stage 216 of the network to the receiver hub 205. Upon receiving this data, the receiver hub 205 may then process each channel independently, generating an audio output corresponding to each microphone module. As such, the resultant output audio or data stream 217 will be multichannel, containing one output channel or data stream to correspond to each microphone module. The details for processing the received audio for each channel may be similar to that for the single microphone module case. Like in the system 100 of FIG. 1, the system 200 of FIG. 2 provides one or more of the reconstructed output or output data streams 217 to an end-point that may include the use of a mixer/recorder 206, broadcast network 207 and/or playback devices 208.

The second stage 216 of the network may also be used for interfacing a user interface 219 for communicating command, control and configuration information to either the receiver hub 205 and/or base stations 203A, 203B, 203C. This is particularly convenient when the second stage 216 of the network is based on and Ethernet connection. In these cases, the user interface 219, is preferably based on a computer and supporting software can serve as an interface to users for embedding command, control and configuration information into (or broadcasting this information to) any selected device connected to the second stage 216 of the network. In alternative embodiments, other forms of a user interface may suffice, and these may include the use of smart phones, tablets or other custom embedded or handheld computing devices. The second stage 216 of the network also provides a communication path 218 for status information from either the receiver hub 205 or any base station 203A, 203B, 203C to be sent back to the user interface 219. In alternative embodiments, the communication path 218 may connect the user interface 219 to one of the base stations 203A, 203B, 203C.

In some embodiments, a desktop or laptop PC with supporting software may serve as a user interface 219. In cases such as these or when a sufficient computing power is otherwise present in the user interface 219, it may also assume the functions associated with the receiver hub 205, essentially merging the operation of the user interface 219 and receiver hub 205 into a single unit. The user interface may itself also contain large amount of disk storage and also assume the role of being an end-point for recording, playback and/or mixing and in some embodiments may itself aid in the broadcast of the output data stream to other end-points. In some embodiments, the role of the receiver hub 205 and one of the base stations 203A, 203B or 203C may be merged into a single unit. For purposes of this disclosure, the term "base station" may be extended to any computing device that has access to the audio data received by multiple base stations, as communicated over the second stage of the network.

Figure 3:
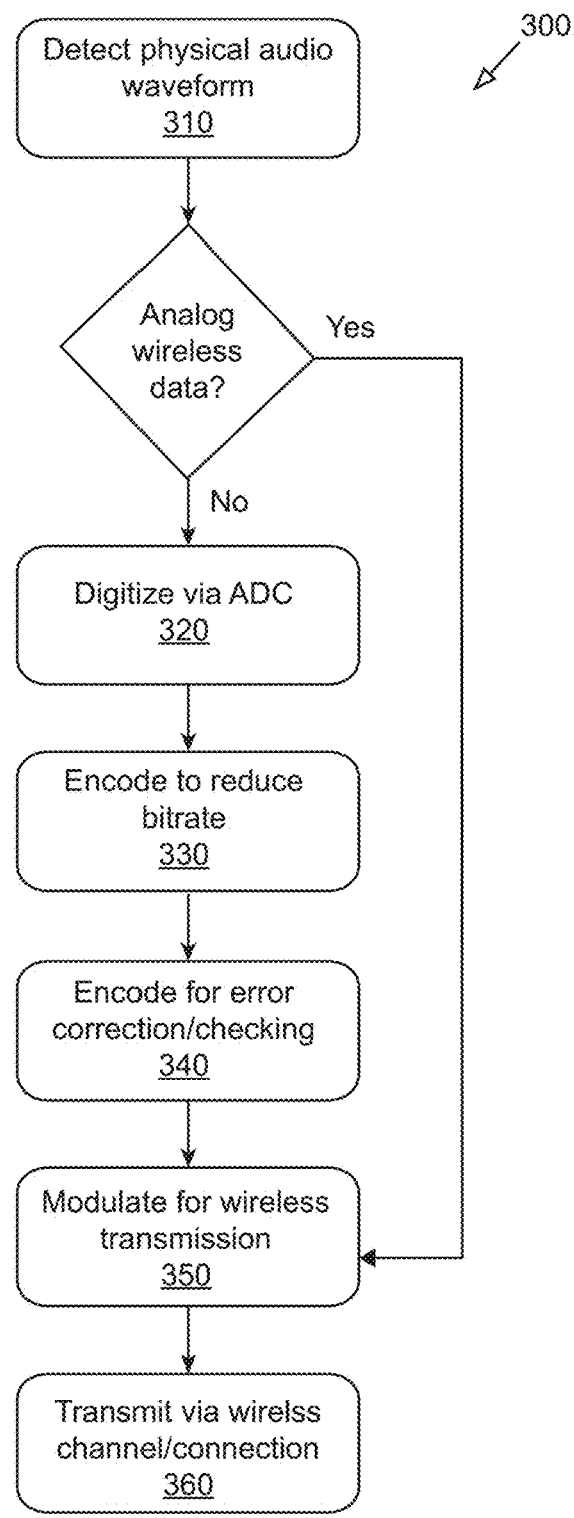
FIG. 3 is a block diagram showing select steps that may be taken by a digital microphone module in transmitting audio data according to an exemplary embodiment of the invention.

FIG. 3 illustrates a simplified block diagram showing select steps that may be taken by a digital microphone module in detecting a physical waveform and transmitting corresponding audio data across the first stage 115 of FIG. 1 (or the first stage 215 of FIG. 2) of the network according to an exemplary embodiment of the invention.

At step 310, method 300 includes using a microphone element 114 (or 214A and 214B) for detecting a physical sound waveform and converting it to an analog electrical waveform. Other operations that may be included in this step include filtering and amplifying this signal and in the case of an analog wireless transmission, optionally companding or limiting. In the case of analog wireless transmission, the process proceeds to step 350. Otherwise, in the case of digital wireless transmission, the process proceeds to step 320. At this step 320, the analog electrical waveform is processed by an analog to digital converter (ADC). Additional operations that may be included in this step include digitally filtering or limiting the digitized audio signal. The process then continue to optional step 330. At step 330, a software algorithm is applied to reduce the required bit rate for transmission of the digital audio data. Typically, a low-latency data compression algorithm is preferred having less than a few milliseconds of delay. The process continues to the next optional step 340 where depending on the desired data transmission rate, error correcting codes may be applied to the bit-stream to improve the robustness to wireless transmission errors. In other cases, redundant bits may be added to allow for error checking. Either error correcting codes or error checking will increase the required transmission data rate, depending on the complexity of the algorithm. The process then proceeds to step 350 where the digital data stream is converted into a modulated waveform suitable for RF transmission. The type of modulation may include FM, FSK, PSK, QPSK, frequency hopping, spread spectrum or other modulation techniques may be suitable. Other operations may include signal conditioning, filtering and amplification of the signal. The process then proceeds to step 360 where the modulated waveform is passed through an RF amplifier and applied to the antennal to convert it into an electromagnetic signal transmitted from the microphone module transmitter, 102 (or 202A and 202B).

Figure 4:
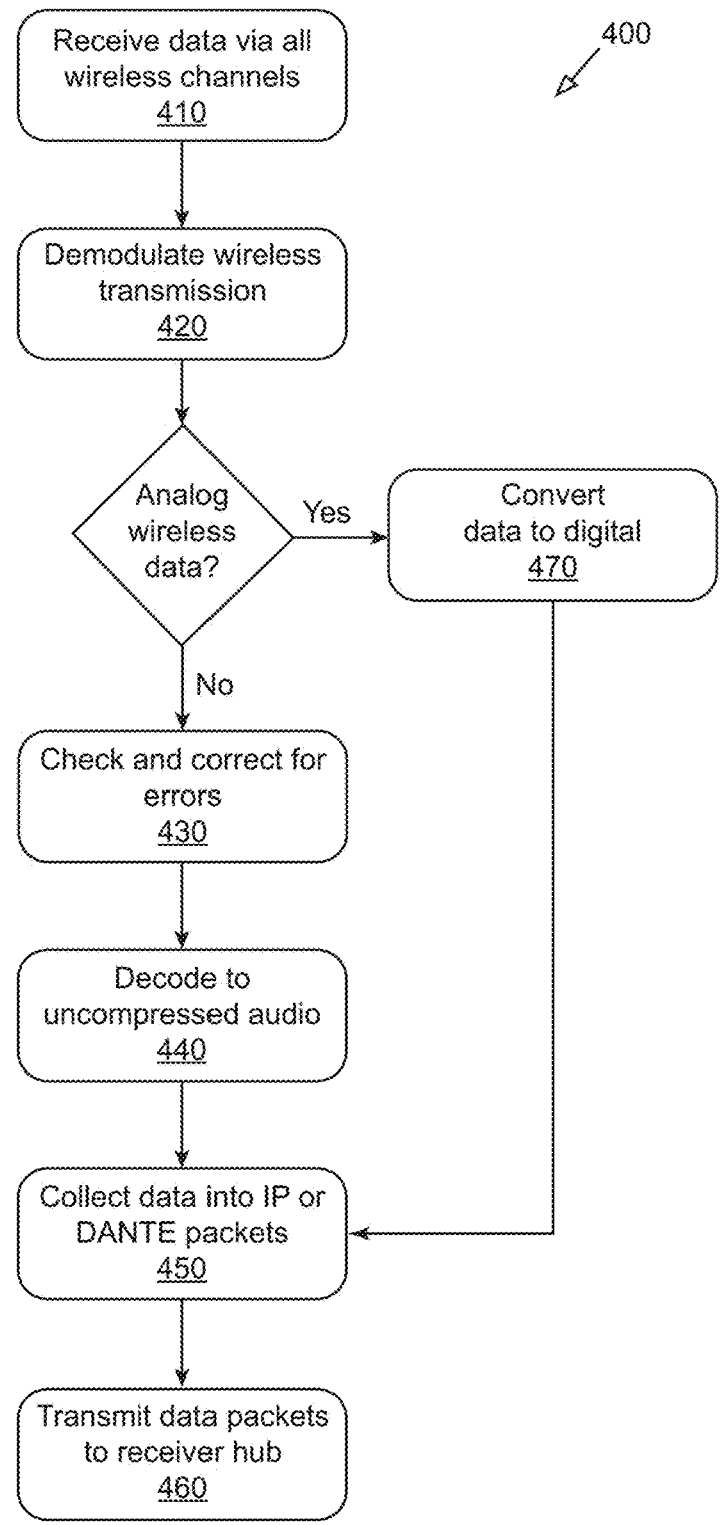
FIG. 4 is a block diagram showing select steps that may be taken for a base station receiving wireless audio data from the microphone module, processing that data and forwarding it to a receiver hub according to an exemplary embodiment of the invention.

FIG. 4 illustrates a simplified block diagram showing select steps that may be taken by a base station (103A, 103B, 103N or 203A, 203B, 203C) in receiving audio data that is wirelessly transmitted across the first stage 115 (or 215) of the network and processing and reformatting the received data for transmission over the second stage 116 (or 216) of the network according to an exemplary embodiment.

At step 410, the method 400 includes the base station receiver 104A, 104B, 104N (or 204A, 204B, 204C) receiving the electromagnetic signal for any active channels (with each channel associated with a microphone module). Additional operations that may be included in step 410 are RF amplifying of the signal received from the antenna, filtering and signal conditioning. The process proceeds to step 420 where the received data is demodulated. If the wireless data is analog, the process proceeds to step 470 where the analog audio signal is converted through an ADC to a digital signal. Additional filtering and/or signal conditioning may be applied here. The process then proceeds to step 450. Otherwise in the case of digital wireless audio being transmitted, the process proceeds to step 430. If step 340 was not included in method 300 for the microphone module 101 (or 201A and 201B), the process proceeds to step 440. Otherwise, the demodulated data is checked for errors and/or the presence of errors is detected. At this point, information may be gathered regarding the quality of signal and such information may be included with audio data subsequently forwarded to the receiver hub 105 (or 205). Upon reaching step 440, if step 330 was not included in method 300, the process forwards to step 450. Otherwise, the data may be optionally decompressed, extracting the original (PCM) raw digital data that was produced by step 320 of method 300. Upon reaching step 450, data is encoded into packets preferably based on the DANTE protocol. Other data packets may be created that also contain information reported regarding the number and location of errors detected, wireless signal levels, noise levels and any other information the base stations can provided that may prove useful to the receiver hub 105. 205. The process then proceeds to step 460 where the data packets are transmitted (or broadcast) over the second stage 116 (or 216) of the network.

Figure 5:
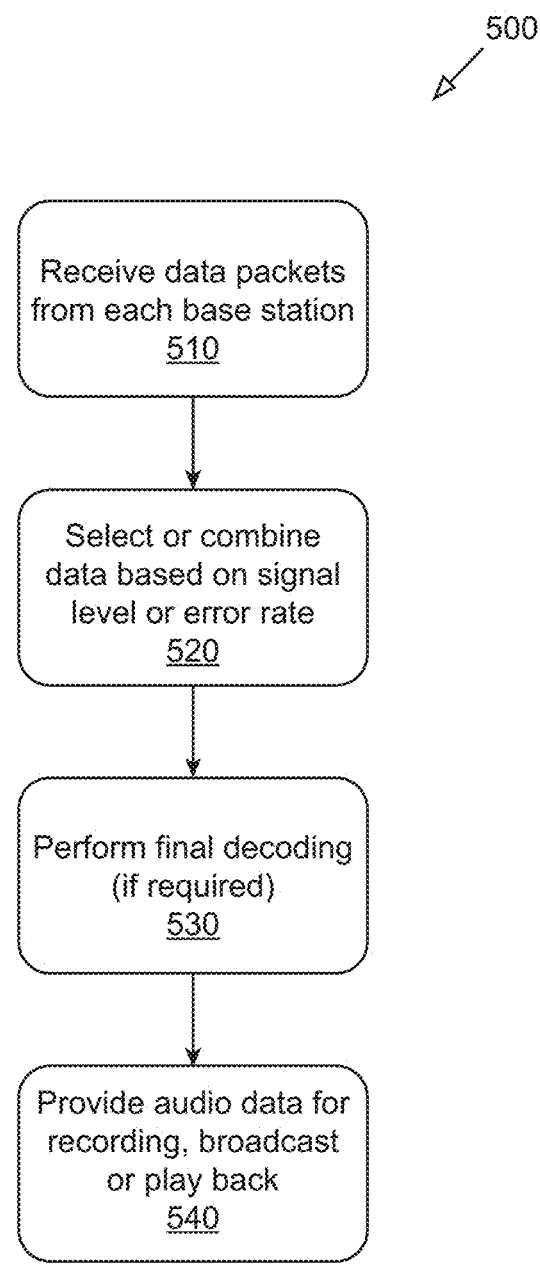
FIG. 5 is a block diagram showing select steps that may be taken for receiving, audio data from each base station by a receiver hub and processing that data before forwarding it to be recorded, broadcast or played back according to an exemplary embodiment of the invention.

FIG. 5 is a block diagram showing select steps that may be taken for receiving, audio data from each base station (103A, 103B, 103N or 203A, 203B, 203C) by a receiver hub 105 (or 205) and processing that data before forwarding it to an end-point according to an exemplary embodiment.

At step 510 of method 500, the receiver hub 105 (or 205) receives data forwarded by each base station (103A, 103B, 103N or 203A, 203B, 203C), preferably in the form of data packets compatible with the DANTE protocol and retrieves audio data and other information relating to signals, errors, error rates, noise or any other information forwarded by the base stations from it. The process proceeds to step 520. At step 520, for each channel of audio, where each microphone module 101 (or 201A and 201B) is assigned to a distinct channel, audio data is combined and/or selected as described previously in this disclosure in order to produce the most robust, the highest resolution and/or lowest noise level for each resultant audio output or data stream 117 (or 217). The process then proceeds to step 530 if required. In many cases, step 530 may be skipped. However, in some embodiments, the receiver hub 105 (or 205) may operate on data before it is fully decoded. For example, data may be encoded using a low delay audio compression technique for reducing bandwidth requirements of the wireless transmission. In some cases where digital transmission is used, it may be desirable to apply selection among data segments to produce an error-free (or reduced error) signal before attempting to decompress the audio signal. After steps 520 and 530 (if required), the process proceeds to step 540 where the resultant audio output or data stream (117 or 217) is provided, sent or broadcast to one or more end-points.

The examples of the invention described above are directed to the operation of a two-stage diversity receiver for capturing an audio signal from one or more wireless microphones. Those skilled in the art will understand that a two-stage diversity receiver like that described above can also be used in other wireless applications where reliable live streaming of data is required.

FIGS. 1-5 illustrate methods according to example embodiments. Although specific orders of steps or functions are suggested among these figures, these are by no means the only order that may prove suitable for realizing the embodiments disclosed here. For example, in many cases, two or more steps or functions may be performed concurrently or with partial concurrence and/or in reverse order or omitted. Furthermore, many additional steps are implied, although not shown, to achieve the functions described here and as being evident to one skilled in the art, are considered part of this disclosure. Many variations will depend on the software and/or hardware systems chosen for a specific embodiment. Upon reading this disclosure, these and other variations will become evident to one skilled in the art and are to be considered as suggested and envisioned within the scope of the disclosure. Furthermore, the word "exemplary" as used throughout this disclosure refers to the meanings: serving as an example, instance or illustration. The embodiments and designs being referred to as "exemplary" in this disclosure are not to be construed as necessarily required, preferred or advantageous over other embodiments or designs.

What is claimed is:

1. A method of connecting a wireless microphone to one ore more endpoints comprising the steps of:

providing at least one microphone module with a transmitting antenna;

providing an array of receiving base stations, wherein each base station has a receiving antenna, is configured to decode received audio data into audio over Ethernet data packets and to collect quality of signal information about the audio data in the respective audio over Ethernet data packets, is configured to augment the audio over Ethernet packets with said quality of signal information, and is further configured to transmit the augmented audio over Ethernet data packets through an Ethernet connection;

providing a receiver hub configured to receive the audio over Ethernet data packets from all of the receiving base stations through an Ethernet connection;

connecting the receiving base stations to the receiving hub using the Ethernet connections to form a second network stage;

detecting a physical audio waveform with the microphone module;

wirelessly transmitting audio data describing the audio waveform through the transmitting antenna of the at least one microphone over a first network stage to each receiving base station in the array within range;

continuously receiving the wirelessly transmitted audio data in at least two of the receiving base stations within range of the transmitting antenna;

in the at least two of the receiving base stations, decoding the received audio data into audio over Ethernet data packets, collecting quality of signal information about the audio data and augmenting the respective audio over Ethernet data packets with said quality of signal information;

transmitting the augmented audio over Ethernet data packets from the at least two receiving base stations over the second stage of the network to be collected in the receiver hub;

reconstructing an output audio waveform in the receiver hub based on combining collected audio data in the augmented audio over Ethernet data packets and the corresponding quality of signal information received from the at least two receiving base stations; and sending or broadcasting the output audio waveform from the receiver hub to one ore more endpoints.

2. The method according to claim 1, wherein the second stage of the network is based on Ethernet connections and uses one of the following audio over Ethernet protocols: DANTE, AES67 and RAVENNA.

3. The method according to claim 1, wherein the second stage of the network comprises a wireless connection and data sent over the second stage is organized into Ethernet frames.

4. The method according to claim 1, wherein the first stage of the network comprises at least one analog data connection.

5. The method according to claim 1, wherein the first stage of the network comprises digital data connections.

6. The method according to claim 5, wherein the microphone module compresses data to reduce the required data bandwidth of the first stage of the network.

7. The method of claim 1 wherein the microphone module is one of multiple microphone modules and the receiving base stations and receiver hub have multiple channels corresponding each to a respective microphone module.

8. The method of claim 1
wherein the output audio waveform is constructed on a basis of selectively combining audio segments corresponding to base stations wherefrom the lowest error rate occurs after applying error correction.

9. A method according to claim 1,
wherein the quality of signal information comprises at least one of the number and location of transmission errors, wireless signal levels, noise levels, signal to noise ratio, and transmission error rate.

10. The method of claim 1
wherein the output audio waveform is constructed on a basis of selectively combining audio segments corresponding to base stations wherefrom the lowest rate of errors is detected.

11. The method of claim 1
wherein each base station reports the signal level corresponding to the transmission of wireless audio data over the first stage of the network to the receiver hub and the receiver hub combines the received audio data based on a function of the reported signal levels.

12. The method of claim 1
wherein the receiver hub combines the received audio data based on a function taken from at least one of: a weighted sum, an average or the median of the received audio waveforms.

13. The method of claim 1 wherein the receiver hub is configured to blend the received audio data to reconstruct the output audio waveform.

14. The method of claim 1 wherein each receiving base station includes a single antenna.

15. The method of claim 1 wherein the transmitting frequency in the first stage is UHF.

16. The method of claim 1 wherein the output audio waveform comprises data formatted in the same audio over Ethernet format as transmitted from the receiving base stations.

* * * * *